(12) United States Patent
Kwon et al.

(10) Patent No.: US 7,742,372 B2
(45) Date of Patent: Jun. 22, 2010

(54) RECORDING MEDIUM, AND METHOD AND APPARATUS FOR RECORDING DEFECT MANAGEMENT INFORMATION ON THE RECORDING MEDIUM

(75) Inventors: Hyug Jin Kwon, Anyang-si (KR); Jung Sup Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 674 days.

(21) Appl. No.: 11/598,041

(22) Filed: Nov. 13, 2006

(65) Prior Publication Data

US 2007/0121460 A1      May 31, 2007

(30) Foreign Application Priority Data

Nov. 25, 2005    (KR) .................. 10-2005-0113592

(51) Int. Cl.
*G11B 20/12* (2006.01)
(52) U.S. Cl. .................. 369/53.17; 369/47.14
(58) Field of Classification Search .............. 369/47.14, 369/53.15–53.17
See application file for complete search history.

(56) References Cited

U.S. PATENT DOCUMENTS

| | | |
|---|---|---|
| 4,558,446 A | 12/1985 | Banda et al. |
| 4,733,386 A | 3/1988 | Shimoi |
| 4,807,205 A | 2/1989 | Picard |
| 4,963,866 A | 10/1990 | Duncan |
| 5,051,849 A | 9/1991 | Fukushima et al. |
| 5,068,842 A | 11/1991 | Naito |
| 5,111,444 A | 5/1992 | Fukushima et al. |
| 5,210,734 A | 5/1993 | Sakurai |
| 5,235,585 A | 8/1993 | Bish et al. |
| 5,237,553 A | 8/1993 | Fukushima et al. |
| 5,247,494 A | 9/1993 | Ohmo et al. |
| 5,319,626 A | 6/1994 | Ozaki et al. |

(Continued)

FOREIGN PATENT DOCUMENTS

CN     1134017     10/1996

(Continued)

OTHER PUBLICATIONS

Office Action for corresponding Chinese Application No. 200580025671.2 dated Dec. 5, 2008.

(Continued)

*Primary Examiner*—Thang V Tran
(74) *Attorney, Agent, or Firm*—Harness, Dickey & Pierce, P.L.C.

(57) ABSTRACT

A recording medium, and a method and apparatus for recording defect management information on the recording medium are disclosed. The method for recording defect management information of a recording medium includes recording a defect entry on the recording medium, wherein the defect entry includes a first field that can identify a defect entry type, a second field recording position information of a defect area within a user data area, and a third field recording position information of a replacement area within a spare area, and recording position information corresponding to the second field and/or the third field in accordance with the defect entry type decided by the first field, wherein, in case of a defect entry type having no corresponding position information, the corresponding field is set to zero (0).

21 Claims, 11 Drawing Sheets

U.S. PATENT DOCUMENTS

| | | |
|---|---|---|
| 5,404,357 A | 4/1995 | Ito et al. |
| 5,442,611 A | 8/1995 | Hosaka |
| 5,448,728 A | 9/1995 | Takano et al. |
| 5,475,820 A | 12/1995 | Natrasevschi et al. |
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,633,764 A | 5/1997 | Ohta |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,890,206 A | 3/1999 | Koike |
| 5,914,928 A | 6/1999 | Takahashi |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,363 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 7,483,349 B2 * | 1/2009 | Park et al. ................. 369/47.14 |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi et al. |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2003/0237024 A1 | 12/2003 | Ogawa et al. |
| 2004/0001408 A1 | 1/2004 | Propps et al. |
| 2004/0004917 A1 | 1/2004 | Lee |
| 2004/0062159 A1 * | 4/2004 | Park et al. ................. 369/47.14 |
| 2004/0062160 A1 | 4/2004 | Park et al. |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 * | 6/2004 | Park et al. ................. 369/47.13 |
| 2004/0125715 A1 | 7/2004 | Lee et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179455 A1 | 9/2004 | Maruyama et al. |
| 2004/0179458 A1 | 9/2004 | Hwang et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |

| | | | | | | |
|---|---|---|---|---|---|---|
| 2005/0055500 | A1 | 3/2005 | Park | JP | 10-187361 | 7/1998 |
| 2005/0060489 | A1 | 3/2005 | Park | JP | 11-110888 | 4/1999 |
| 2005/0068877 | A1 | 3/2005 | Yeo | JP | 11-203792 | 7/1999 |
| 2005/0083740 | A1 | 4/2005 | Kobayashi | JP | 2000-090588 | 3/2000 |
| 2005/0083767 | A1 | 4/2005 | Terada et al. | JP | 2000-149449 | 5/2000 |
| 2005/0083804 | A1 | 4/2005 | Hwang et al. | JP | 2000-195178 | 7/2000 |
| 2005/0083830 | A1 | 4/2005 | Martens et al. | JP | 2000-215612 | 8/2000 |
| 2005/0169133 | A1* | 8/2005 | Hwang et al. ............ 369/47.14 | JP | 2000-285607 | 10/2000 |
| 2005/0185551 | A1* | 8/2005 | Hwang et al. ............ 369/53.17 | JP | 2001-023317 | 1/2001 |
| 2005/0195716 | A1 | 9/2005 | Ko et al. | JP | 2001-069440 | 3/2001 |
| 2005/0207262 | A1 | 9/2005 | Terada et al. | JP | 2001-110168 | 4/2001 |
| 2005/0265191 | A1* | 12/2005 | Hwang et al. ............ 369/53.15 | JP | 2001-351334 | 12/2001 |
| 2005/0289389 | A1 | 12/2005 | Yamagami et al. | JP | 2001-357623 | 12/2001 |
| 2006/0077827 | A1 | 4/2006 | Takahashi | JP | 2002-015507 | 1/2002 |
| 2006/0195719 | A1 | 8/2006 | Ueda et al. | JP | 2002-015525 | 1/2002 |
| 2006/0203635 | A1 | 9/2006 | Ko et al. | JP | 2002-056619 | 2/2002 |
| 2006/0203638 | A1 | 9/2006 | Ko et al. | JP | 2002-215612 | 8/2002 |
| 2006/0203684 | A1 | 9/2006 | Ko et al. | JP | 2002-245723 | 8/2002 |
| 2006/0227694 | A1 | 10/2006 | Woerlee et al. | JP | 2002-288938 | 10/2002 |
| 2007/0294571 | A1 | 12/2007 | Park et al. | JP | 2002-329321 | 11/2002 |
| 2008/0046780 | A1 | 2/2008 | Shibuya et al. | JP | 2002-352522 | 12/2002 |
| | | | | JP | 2005-535993 | 2/2004 |
| | | | | JP | 2005-538490 | 3/2004 |

FOREIGN PATENT DOCUMENTS

| | | | | | |
|---|---|---|---|---|---|
| CN | 1140897 | 1/1997 | JP | 2004-280864 | 10/2004 |
| CN | 1227950 | 9/1999 | JP | 2004-280865 | 10/2004 |
| CN | 1273419 | 11/2000 | JP | 2005-004912 | 1/2005 |
| CN | 1652217 A | 8/2005 | JP | 2005-535993 | 11/2005 |
| CN | 1675708 | 9/2005 | JP | 2005-538490 | 12/2005 |
| CN | 1685426 | 10/2005 | JP | 2005-538491 | 12/2005 |
| DE | 199 54 054 | 6/2000 | JP | 2006-519445 | 8/2006 |
| EP | 0 314 186 | 5/1989 | KR | 10-2004-0015602 | 2/2004 |
| EP | 0 325 823 | 8/1989 | RU | 2005-103626 | 9/2005 |
| EP | 0 350 920 | 1/1990 | RU | 2005-127337 | 2/2006 |
| EP | 0 464 811 | 1/1992 | TW | 371752 | 10/1999 |
| EP | 0 472 484 | 2/1992 | TW | 413805 | 12/2000 |
| EP | 0 477 503 | 4/1992 | WO | WO 84/00628 | 2/1984 |
| EP | 0 556 046 | 8/1993 | WO | WO 96/30902 | 10/1996 |
| EP | 0 871 172 | 10/1998 | WO | WO 97/22182 | 6/1997 |
| EP | 0 908 882 | 4/1999 | WO | WO 00/54274 | 9/2000 |
| EP | 0 974 967 | 1/2000 | WO | WO 01/22416 | 3/2001 |
| EP | 0 989 554 | 3/2000 | WO | WO 01/93035 | 12/2001 |
| EP | 0 997 904 | 5/2000 | WO | WO 03/007296 | 1/2003 |
| EP | 1 026 681 | 8/2000 | WO | WO 03/025924 | 3/2003 |
| EP | 1 043 723 | 10/2000 | WO | WO 03 079353 | 9/2003 |
| EP | 1 132 914 | 9/2001 | WO | WO 2004/015707 | 2/2004 |
| EP | 1 148 493 | 10/2001 | WO | WO 2004/015708 | 2/2004 |
| EP | 1 152 414 | 11/2001 | WO | WO 2004/025648 | 3/2004 |
| EP | 1 239 478 | 9/2002 | WO | WO 2004/025649 | 3/2004 |
| EP | 1 274 081 | 1/2003 | WO | WO 2004/029668 | 4/2004 |
| EP | 1 298 659 | 4/2003 | WO | WO 2004/029941 | 4/2004 |
| EP | 1 329 888 | 7/2003 | WO | WO 2004/034396 | 4/2004 |
| EP | 1347452 | 9/2003 | WO | WO 2004/036561 | 4/2004 |
| EP | 1 547 065 | 6/2005 | WO | WO 2004/053872 | 6/2004 |
| EP | 1 564 740 | 8/2005 | WO | WO 2004/053874 | 6/2004 |
| EP | 1 612 790 | 1/2006 | WO | WO 2004/068476 | 8/2004 |
| EP | 1623422 | 2/2006 | WO | WO 2004/075180 | 9/2004 |
| GB | 2 356 735 | 5/2001 | WO | WO 2004/079631 | 9/2004 |
| JP | 63-091842 | 4/1988 | WO | WO 2004/079731 | 9/2004 |
| JP | 1-263955 | 10/1989 | WO | WO 2004/079740 | 9/2004 |
| JP | 2-023417 | 1/1990 | WO | WO 2004/081926 | 9/2004 |
| JP | 5-274814 | 10/1993 | WO | WO 2004/093035 | 10/2004 |
| JP | 6-349201 | 12/1994 | WO | WO 2004/100155 | 11/2004 |
| JP | 8-096522 | 4/1996 | WO | WO 2004/100156 | 11/2004 |
| JP | 9-145634 | 6/1997 | WO | WO 2005/004123 | 1/2005 |
| JP | 9-231053 | 9/1997 | WO | WO 2005/004154 | 1/2005 |
| JP | 10-050005 | 2/1998 | WO | WO 2005/006315 A1 | 1/2005 |
| JP | 10-050032 | 2/1998 | | | |
| JP | 10-187356 | 7/1998 | | | |
| JP | 10-187357 | 7/1998 | | | |

OTHER PUBLICATIONS

Search Report for corresponding European Application No. 05771159.0 dated Mar. 4, 2009.
International Search Report and Written Opinion dated Aug. 31, 2004.

International Search Report and Written Opinion dated Jan. 13, 2006.
International Search Report and Written Opinion dated Mar. 8, 2007.
"JIS Handbook Data Processing for Hardware," Japanese Standards Association Inc., Japan, Apr. 21, 1999, pp. 1064-1070.
Search Report for corresponding European Application No. 07110035.8 dated Jun. 5, 2008.
Office Action for corresponding Russian Application No. 2006104619/28 dated Jun. 26, 2008.
International Search Report dated Feb. 13, 2007.

U.S. Notice of Allowance dated Jun. 10, 2009 issued in corresponding U.S. Appl. No. 12/314,736.
Office Action for Russian Application No. 2007 102586/28(002775) dated Oct. 19, 2009.
Office Action for U.S. Appl. No. 11/203,111 dated Dec. 22, 2009.
Chinese Office Action dated Feb. 5, 2010 for Chinese Application No. 2006-80039631.8.

* cited by examiner

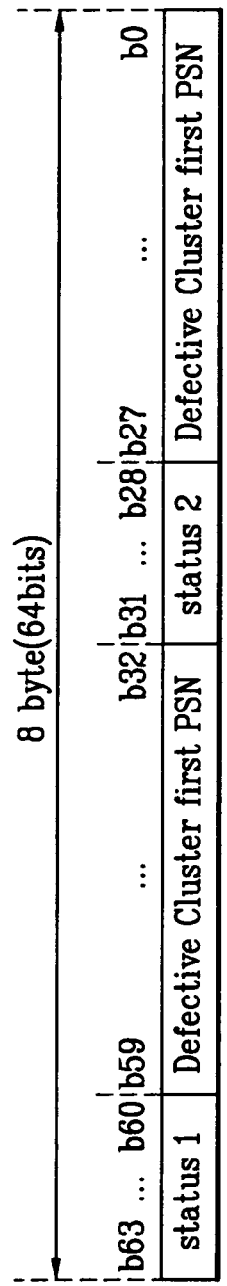

FIG. 4B

DFL (with sorting)

| status1 | Defective Cluster first PSN | status2 | Replacement Cluster first PSN |
|---|---|---|---|
| 0000b | first PSN in 'A' Cluster | 0000b | first PSN in 'a' Cluster |
| 1000b | first PSN in 'B' Cluster | 0000b | first PSN in 'e' Cluster |
| 0000b | first PSN in 'C' Cluster | 0000b | first PSN in 'c' Cluster |
| 1000b | first PSN in 'D' Cluster | 0000b | first PSN in 'f' Cluster |
| 0001b | first PSN in 'E' Cluster | 0000b | 0 00 00 00h |
| 0010b | 0 00 00 00h | 0000b | first PSN in 'h' spare Cluster |
| 0010b | 0 00 00 00h | 0000b | first PSN in 'i' spare Cluster |
| 0010b | 0 00 00 00h | 0000b | first PSN in 'j' spare Cluster |
| 0111b | 0 00 00 00h | 0000b | first PSN in 'b' Unusable Cluster |
| 0111b | 0 00 00 00h | 0000b | first PSN in 'd' Unusable Cluster |
| 0111b | 0 00 00 00h | 0000b | first PSN in 'g' Unusable Cluster |

RAD: rows 1-4
NRD: row 5
SPR: rows 6-8
unusable: rows 9-11

US 7,742,372 B2

RECORDING MEDIUM, AND METHOD AND APPARATUS FOR RECORDING DEFECT MANAGEMENT INFORMATION ON THE RECORDING MEDIUM

This application claims the benefit of the Korean Patent Application No. P2005-0113592, filed on Nov. 25, 2005, which is hereby incorporated by reference as if fully set forth herein.

BACKGROUND OF THE INVENTION

1. Field of the Invention

The present invention relates to a recording medium, and more particularly, to a recording medium, and a method and apparatus for recording defect management information on the recording medium. Although the present invention is suitable for a wide scope of applications, it is particularly suitable for efficiently managing defect management information and for facilitating a sorting process of defect entries configuring the defect management information.

2. Discussion of the Related Art

The optical disc is widely used as a recording medium capable of recording (and/or storing) a large amount of data. Particularly, a high-density optical recording medium capable of recording/storing high-quality video data and high-quality audio data, for example, a Blu-ray Disc (BD), has been being developed for a long period of time. The BD acting as the next-generation recording medium has been considered to be the next-generation optical recording solution capable of recording/storing much more data than a conventional DVD. In recent times, the international standard technical specification associated with the BD has been established along with those of other digital devices.

Many developers have conducted intensive research into the introduction of a preferable recording method, and more particularly, an optimum method of recording and managing defect management information using a next-generation recording medium, such as the BD. However, the technical standard for the BD has not yet been established, and, therefore, the developers have difficulty in developing the completed BD-based optical recording/reproducing apparatus.

SUMMARY OF THE INVENTION

Accordingly, the present invention is directed to a recording medium, and a method and apparatus for recording defect management information on the recording medium that substantially obviate one or more problems due to limitations and disadvantages of the related art.

An object of the present invention is to provide a method of formatting the recording medium and a method of sorting defect management information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for recording defect management information of a recording medium includes recording a defect entry on the recording medium, wherein the defect entry includes a first field that can identify a defect entry type, a second field recording position information of a defect area within a user data area, and a third field recording position information of a replacement area within a spare area, and recording position information corresponding to the second field and/or the third field in accordance with the defect entry type decided by the first field, wherein, in case of a defect entry type having no corresponding position information, the corresponding field is set to zero (0).

In another aspect of the present invention, in recording a defective cluster as a defect entry within a spare area, a method for recording defect management information of a recording medium, includes recording status information for identifying a type of the defect entry (i.e., defect entry type) in a first field of the defect entry, setting to zero (0) a second field of the defect entry recording position information of a defect area within a user data area, and recording an address of the defective cluster within the corresponding spare area in a third field of the defect entry, wherein position information of a replacement area within the spare area is recorded.

In another aspect of the present invention, a method for updating defect management information includes, when updating an already existing defect list by using a new defect entry as the defect management information, sorting the defect entries registered in the already existing defect list and the defect entries that are to be updated, thereby updating the defect list, wherein the sorting of the defect entries is performed by sorting the defect entries by each type, and by sorting the defect entries by order of physical sector address (PSN) within the same defect entry type.

In another aspect of the present invention, in a method for sorting a plurality of defect entries, the method for sorting defect entries includes primarily sorting the defect entries by identifying the defect entries by each type, and based upon the primary sorting, and within the same defect entry type, secondarily sorting the defect entries sequentially starting from the lowest physical sector number (PSN) among defective clusters and/or replacement clusters recording in the corresponding entry type.

In another aspect of the present invention, a method for formatting a recording medium includes selecting a certification method, and, when using a quick certification method, certifying only defect entries included in a sorted defect list, so as to recheck whether any defect exists, wherein the defect entries on the sorted defect list are sorted by defect entry type, and wherein, within the same defect entry type, sorting is performed sequentially starting from a cluster having the lowest physical sector number (PSN), among defective clusters and/or replacement clusters recorded in the corresponding defect entry type.

In another aspect of the present invention, a recording medium includes a data area and a lead-in area adjacent to the data area, and a defect management area recording in the lead-in area defect entries for managing defects within the data area, wherein the defect entry being recorded in the defect management area comprises a first field that can identify a defect entry type, a second field recording position information of a defect area within a user data area, and a third field recording position information of a replacement area within a spare area, and wherein position information corresponding to the second field and/or the third field is recorded in accordance with the defect entry type decided by the first field, wherein, in case of a defect entry type having no corresponding position information, the corresponding field is set to zero (0).

In another aspect of the present invention, an apparatus for recording defect management information on a recording medium, includes a pick-up, and a microcomputer controlling the pick-up so that defective clusters newly generated during a recording and/or reproducing of the recording medium are recorded as a defect entry, wherein the defect entry is recorded by configuring a first field that can identify a defect entry type, a second field recording position information of a defect area within a user data area, and a third field recording position information of a replacement area within a spare area, and controlling the pick-up so that position information corresponding to the second field and/or the third field is recorded in accordance with the defect entry type decided by the first field, wherein, in case of a defect entry type having no corresponding position information, the corresponding field is set to zero (0).

In a further aspect of the present invention, an apparatus for recording defect management information on a recording medium, includes a pick-up, and a microcomputer controlling the pick-up so that defective clusters within a spare area newly generated during a recording and/or reproducing of the recording medium are recorded as a defect entry, wherein status information for identifying a type of the defect entry (i.e., defect entry type) is recorded in a first field of the defect entry, a second field of the defect entry recording position information of a defect area within a user data area is set to zero (0), and a third field of the defect entry is recorded with an address of the defective cluster within the corresponding spare area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2A and FIG. 2B respectively illustrate a structure of a defect entry as a defect management information according to the present invention;

FIG. 4A and FIG. 4B respectively illustrate a defect management method and a method for recording defect management information;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, a magnetic disc, and a magnetic tape, etc. For the convenience of description and better understanding of the present invention, the optical disc, and more particularly, the blu-ray disc (BD) will hereinafter be exemplarily used as the above-mentioned recording medium in the present intention. It is also apparent that the spirit and scope of the present invention will be identically applied to other types of recoding media.

Figure 1:
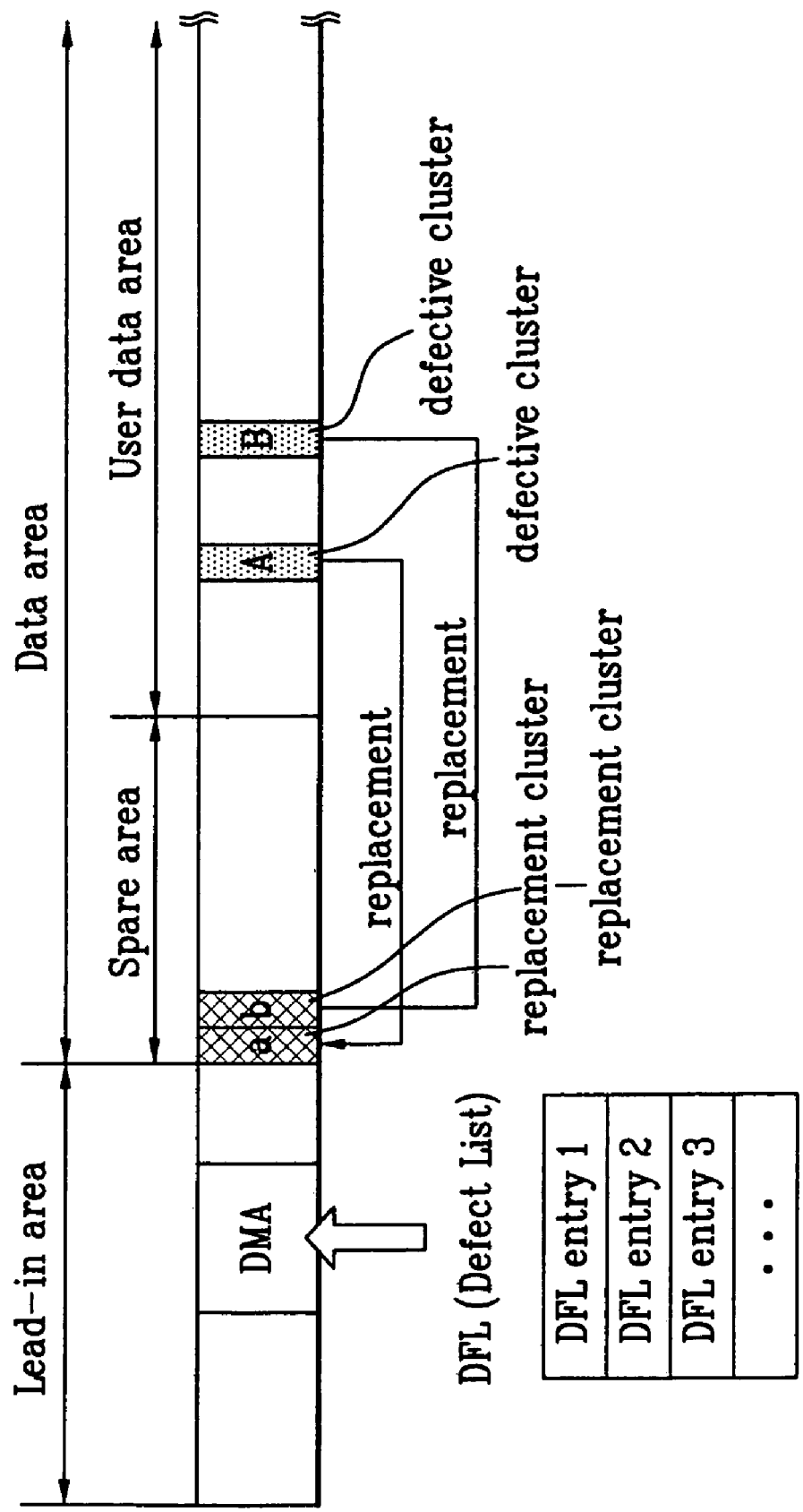
FIG. 1 illustrates exemplary process steps of a defect management method in a recording medium applied in the present invention.

FIG. 1 illustrates exemplary process steps of a defect management method in a recording medium applied in the present invention. Referring to FIG. 1, the optical disc sequentially consists of a lead-in area and a data area starting from the inner circumference of the disc. The data area includes a spare area and a user data area. In the example shown in FIG. 1, the spare area is formed in an inner area of the data area. However, this structure is only exemplary and does not limit the structure of the optical disc. More specifically, the spare area may be provided in an outer area of the data area, or may be provided in both the inner and outer areas of the data area.

When a defect is detected in a particular recording unit (e.g., a cluster) within the user data area, the data that are recorded or that are to be recorded on the cluster, from which the defect has been detected, are replacement recorded on a specific cluster within the spare area. After replacement recording the defective cluster on the replacement cluster within the spare area, the fact that the data have been replacement recorded should be recorded as a separate set of management information. In other words, a defect management area (DMA) is provided in the lead-in area, and the management information is recorded on the DMA. Most particularly, the management information is referred to as a defect list (DFL). Each defect list is configured of at least one defect entry. For example, referring to FIG. 1, when defective clusters A and B are detected within the user data area, data corresponding to clusters A and B are replacement recorded one replacement clusters a and b within the spare area. The fact that the data have been replacement recorded is added to the defect list as a defect entry, thereby being recorded on the DMA.

FIG. 2A and FIG. 2B respectively illustrate a structure of a defect entry as a defect management information according to the present invention. More specifically, FIG. 2A illustrates a defect entry structure, and FIG. 2B illustrates defect entry types. Referring to FIG. 2A, one defect entry may be configured of 8 bytes (i.e., 64 bits). Herein, the 64-bit defect entry is largely divided into 3 sections. The defect entry includes a first field (a 4-bit 'status 1' field and a 4-bit 'status 2' field), a second field (a 28-bit 'Defective Cluster first PSN' field), and a third field (a 28-bit 'Replacement Cluster first PSN' field). Herein, the first field indicates the type and status of the defect entry, the second field records a position information of the defective cluster, and the third field records a position information of the replacement cluster.

The 4-bit 'status 1' field is used as information deciding the defect entry type. Referring to FIG. 2B, for example, when the value of the 4-bit 'status 1' field is '0000b', this indicates that a replacement cluster is normally allocated and that the defect entry is replacement recorded. This defect entry is referred to as a 'Re-Allocatable Defect (RAD) 1 type'. When the value of the 4-bit 'status 1' field is '1000b', this indicates that a replacement cluster is normally allocated but the defect entry is not replacement recorded. This defect entry is referred to as a 'Re-Allocatable Defect (RAD) 2 type'. When the value of the 4-bit 'status 1' field is '0001b', this indicates that a replacement cluster is not allocated for the defective cluster. This defect entry type is referred to as a 'Non Re-allocatable Defect (NRD) type'. Furthermore, when the value of the 4-bit 'status 1' field is '0010b', this indicates that a replacement cluster is normally allocated but the cluster is allocated in the spare area so as to be replacement recorded in a later process. This defect entry type is referred to as a 'Spare (SPR) type'. Finally, when the value of the 4-bit 'status 1' field is '0111b', this indicates that a defect has been detected (or has occurred) in a replacement cluster, and therefore the cluster cannot be used replacement recording in a later process. This defect entry type is referred to as an 'unusable type'.

More specifically, a plurality of defect entries exists within the defect list (DFL). And, each defect entry is sorted in accordance with a particular sorting method and recorded on the defect list. Referring to FIG. 2B, the sorting method corresponds to recording the defect entry starting from the second bit (bit 62) thereof in an ascending order. Accordingly, the defect entries are sorted by the 'status 1' field, which is configured of 4 bits (bit 63 to bit 60). This indicates that sorting is performed by each defect entry type. Herein, recording of the defect entry is not performed starting from the first bit (bit 63) so that, when performing the recording process of the defect entries, 'RAD 1 type=0000b' and 'RAD 2 type=1000b' may be considered as the same defect entry. Therefore, when sorting the defect entries by ascending order starting from the second bit (bit 62), defect entries within the defect list are sorted by the following order: 'status 1' field → second field ('Defective Cluster first PSN' field) → 'status 2' field → third field ('Replacement Cluster first PSN' field).

Figure 3A:
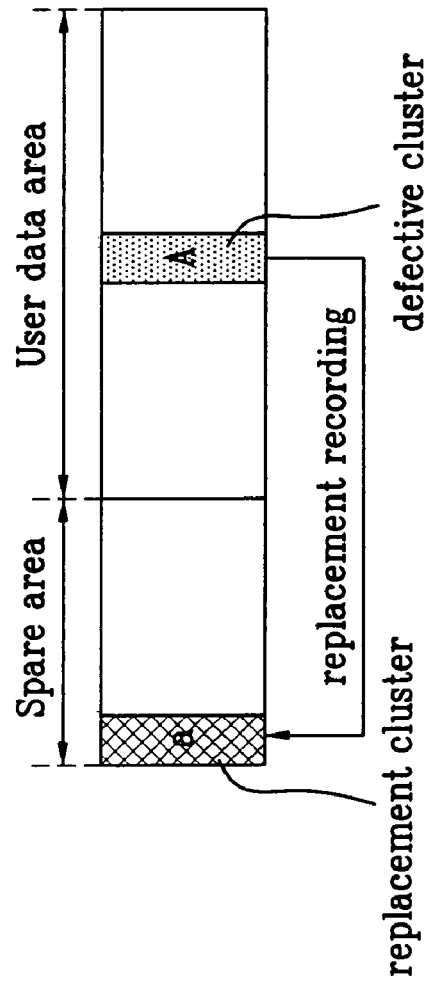
FIG. 3A to FIG. 3E illustrate examples for describing defect entry types and recording methods according to the present invention.

FIG. 3A to FIG. 3E illustrate examples for describing defect entry types and recording methods according to the present invention. Herein, FIG. 3A illustrates the 'RAD 1 type' defect entry. More specifically, the RAD 1 defect entry has normally replacement recorded the defective cluster within the replacement cluster. Therefore, for example, the data that have been or that will be recorded on the defective cluster (A) within the user data area are replacement recorded in the replacement cluster (a) within the spare area. In other words, the method of recording the 'RAD 1 type' defect entry includes recording a '0000b' value identifying the defect entry as the 'RAD 1 type' within the 'status 1' field, recording a first physical sector number (PSN) of the defective cluster (A) within the second field ('Defective Cluster first PSN' field), recording a '0000b' value indicating a normal status within the 'status 2' field, and recording a first physical sector number (PSN) of the replacement cluster (a) within the third field ('Replacement Cluster first PSN' field). Accordingly, a value indicating a new status that is decided during a standardization process may be recorded in the 'status 2' field in the present invention. However, only the examples of the defect entries having a normal status value '0000b' will be given in the description of FIG. 3A to FIG. 4B of the present invention.

Figure 3B:
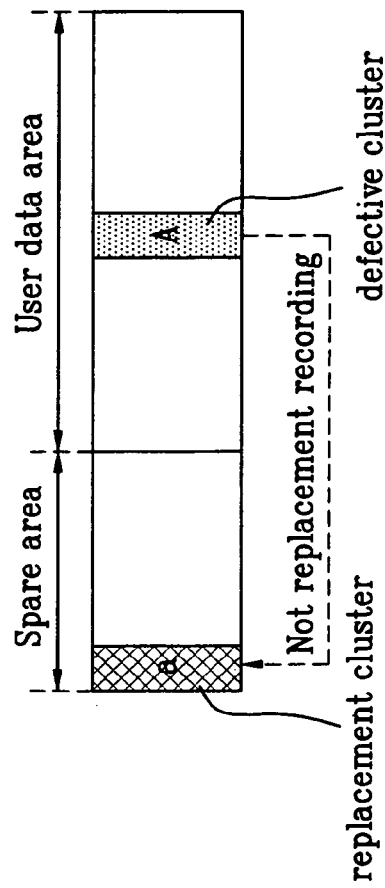

FIG. 3B illustrates the 'RAD 2 type' defect entry. More specifically, the RAD 1 defect entry allocates a replacement cluster corresponding to the defective cluster, but the replacement recording is not yet performed on the replacement cluster. Therefore, for example, a replacement cluster (a) is allocated within the spare area for the data that have been or that will be recorded on the defective cluster (A) within the user data area. In other words, the method of recording the 'RAD 2 type' defect entry includes recording a '1000b' value identifying the defect entry as the 'RAD 2 type' within the 'status 1' field, recording a first physical sector number (PSN) of the defective cluster (A) within the second field ('Defective Cluster first PSN' field), recording a '0000b' value indicating a normal status within the 'status 2' field, and recording a first physical sector number (PSN) of the replacement cluster (a) within the third field ('Replacement Cluster first PSN' field).

Figure 3C:
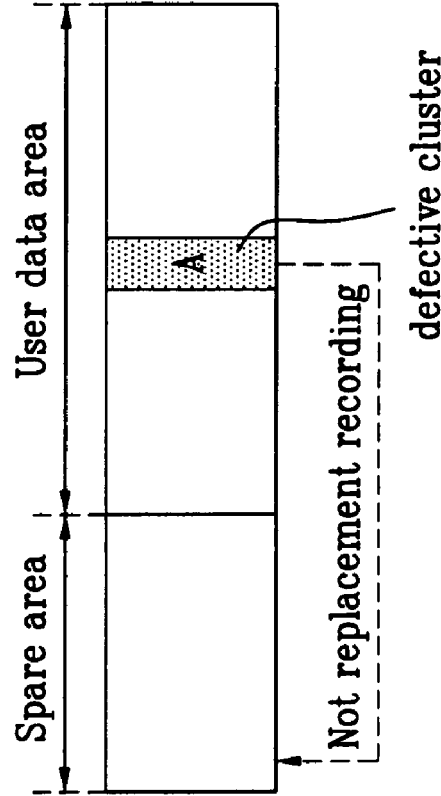

FIG. 3C illustrates the 'NRD type' defect entry. More specifically, the NRD defect entry has not yet allocated the replacement cluster corresponding to the defective cluster. Therefore, for example, when the defective cluster (A) is detected in the user data area, only the defect entry for managing the detected defective cluster (A) is recorded. In other words, the method of recording the 'NRD type' defect entry includes recording a '0001b' value identifying the defect entry as the 'NRD type' within the 'status 1' field, recording a first physical sector number (PSN) of the defective cluster (A) within the second field ('Defective Cluster first PSN' field), recording a '0000b' value indicating a normal status within the 'status 2' field, and recording zero values ('0 00 00 00h') to all 28 bits within the third field ('Replacement Cluster first PSN' field).

Figure 3D:
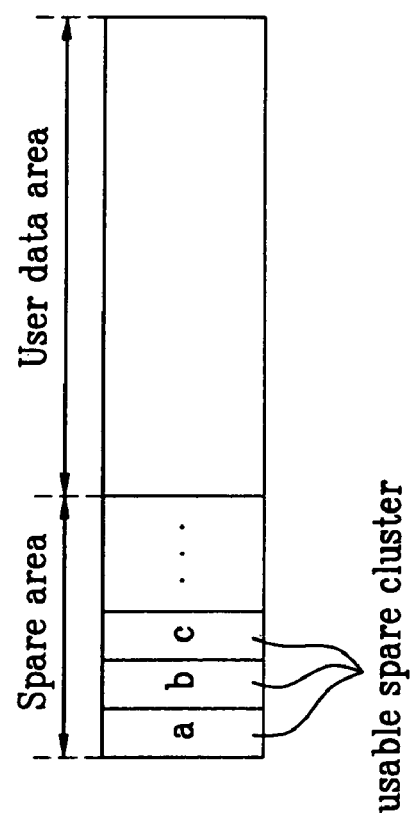

FIG. 3D illustrates the 'SPR type' defect entry. More specifically, the SPR defect entry represents a normal replacement cluster existing within the spare area for a later replacement recording process. Therefore, for example, when a defective cluster is detected (or occurs), replacement recording may be performed on the position of the replacement cluster designated within the first SPR defect entry among the plurality of defect entries registered as the SPR defect entry according to the defect list sorting. In other words, the method of recording the 'SPR type' defect entry includes recording a '0010b' value identifying the defect entry as the 'SPR type' within the 'status 1' field, recording zero values ('0 00 00 00h') to all 28 bits within the second field ('Defective Cluster first PSN' field) since a corresponding defective cluster is not yet allocated, recording a '0000b' value indicating a normal status within the 'status 2' field, and recording a first PSN of the replacement cluster (e.g., 'a', 'b', and 'c') within the third field ('Replacement Cluster first PSN' field). Referring to FIG. 3D, if three replacement clusters (a), (b), and (c) are registered as SPR type defect entries, the replacement clusters are sorted and recorded within the spare area by order of the lowest PSN, such as 'a' → 'b' → 'c'

Figure 3E:
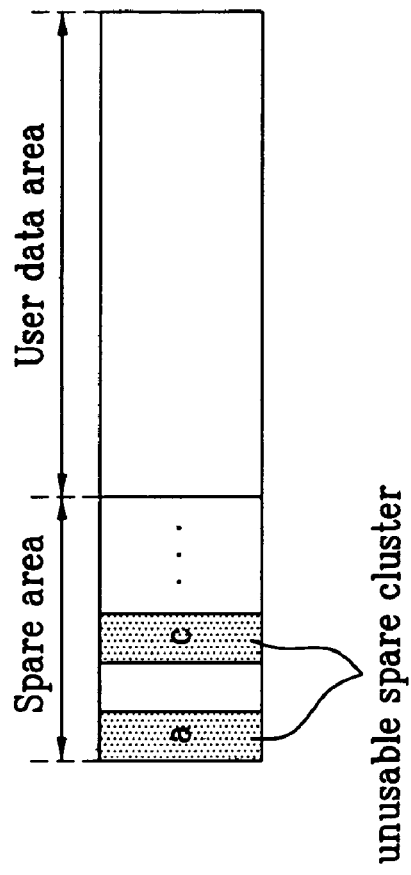

FIG. 3E illustrates the 'unusable type' defect entry. More specifically, the unusable defect entry represents clusters that are not used due to defects detected within the spare area. Therefore, for example, when a particular cluster within the spare area is detected to be defective, the cluster is replaced with a normal replacement cluster registered within the SPR defect entry, whereas the defect-detected cluster within the spare area is registered and managed as an 'unusable' defect entry. In other words, the method of recording the 'unusable' defect entry includes recording a '0111b' value identifying the defect entry as the 'unusable type' within the 'status 1' field, recording zero values ('0 00 00 00h') to all 28 bits within the second field ('Defective Cluster first PSN' field) since a corresponding defective cluster does not exist, recording a '0000b' value indicating a normal status within the 'status 2' field, and recording a first PSN of the clusters (e.g., 'a', and 'c') within the spare area that are detected to be defective within the third field ('Replacement Cluster first PSN' field). Referring to FIG. 3E, if two replacement clusters (a) and (c) are detected to be defective within the spare area, each of the clusters is registered as an 'unusable' defect entry. And, these 'unusable' defect entries are sorted and recorded within the spare area by order of the lowest PSN, such as 'a' → 'c'

More specifically, in the present invention, when recording the second field ('Defective Cluster first PSN' field) of the 'unusable' defect entry, all 28 bits therein is required to be recorded as zero values ('0 00 00 00h'). If an arbitrary set of dummy data that does not correspond to the zero value ('0 00 00 00h') is recorded on the second field ('Defective Cluster first PSN' field), sorting may be performed randomly and not by the particular sorting order described above. In other words, as the second field is sorted earlier than the third field, if the value of the second field is recorded as arbitrary dummy data, sorting of the 'unusable' defect entries may not be performed properly. Accordingly, if a formatting process including a certification process is to be performed, and if the sorting of the 'unusable' defect entries is not properly performed, a problem may occur in locating the place (or position) of the defective cluster designated by the corresponding 'unusable' defect entry. Particularly, when performing a formatting process including certification, a pick-up means frequently performs search operations such as track jump operations in order to locate the defective cluster position (or place) corresponding to the 'unusable' defect entry within the spare area. Such frequent search operations deteriorates the overall system performance.

In order to resolve such problems, it is preferable that the 'unusable' defect entries are sorted within the spare area by an-ascending-order starting from the lowest PSN. Accordingly, in order to perform a preferable sorting of the 'unusable' defect entries, the second field ('Defective Cluster first PSN' field) value within the 'unusable' defect entries should be recorded as zero values ('0 00 00 00h'). Therefore, when performing the formatting process including certification, reference is made to the 'unusable' defect entries sorted as described above (e.g., sorting is performed by the position order of the defective clusters within the spare area that are recorded on the third field of the 'unusable' defect entries), so that the defective clusters can be certified by the PSN order sorted as described above. Thus, without having to perform any search operation or by performing only a minimum number of search operations, such as track jump operations, the system may search the position of each defective cluster within the spare area by a specific order so as to certify the corresponding cluster.

Figure 4A:
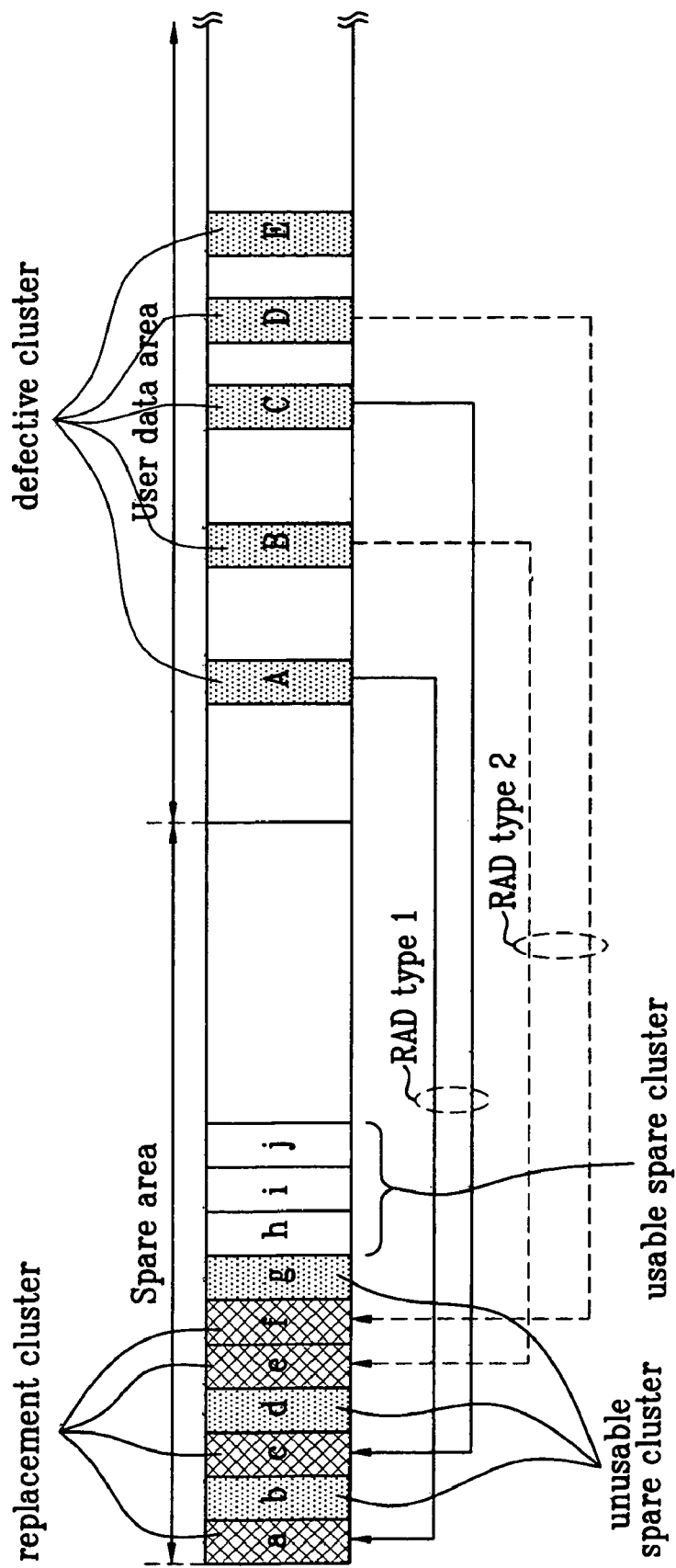

FIG. 4A and FIG. 4B respectively illustrate a defect management method and a method for recording defect management information. In the examples shown in FIG. 4A and FIG. 4B, each defect entry type is sorted to configure a defect list (DFL). For example, as shown in FIG. 4A, each of the defective clusters 'A' and 'C' and replacement clusters 'a' and 'c' configures the defect entries associated with the 'RAD 1 type'. Also, each of the defective clusters 'B' and 'D' and replacement clusters 'e' and 'f' configures the defect entries associated with the 'RAD 2 type'. And, the defective cluster 'E' configures the defect entry associated with the 'NRD type'. Furthermore, each of the replacement clusters 'h', 'i', and 'j' configures the defect entries associated with the 'SPR type'. Finally, each of the defective clusters 'b', 'd', and 'g' within the spare area configures the defect entries associated with the 'unusable type'

In the example shown in FIG. 4A, FIG. 4B illustrates a defect list (DFL) having the defect entries sorted therein. The defect entries are first sorted by defect entry types, more specifically, by the order of 'RAD' type → 'NRD' type → 'SPR' type → 'unusable' type. Thereafter, within the same defect entry type, the defect entries are sorted in accordance with the values recorded in the second field ('Defective Cluster first PSN' field) and/or the third field ('Replacement Cluster first PSN' field). Based upon the above-described sorting rule, FIG. 4B illustrates in a table form the final sorted configuration of the defect entries generated, as shown in FIG. 4A. Accordingly, although it is apparent that the normal replacement clusters within the spare area are all included as the 'SPR' type entries, only 3 normal clusters 'h', 'i', and 'j', will be illustrated in FIG. 4B, for simplicity of the description of the present invention. Furthermore, apart from the defect entry types described in the present invention, other defect entry types (e.g., a Possibly Bad Area (PBA) type) may exist, and, in this case, the same defect entry recording method and sorting method according to the present invention may be applied herein.

Figure 5:
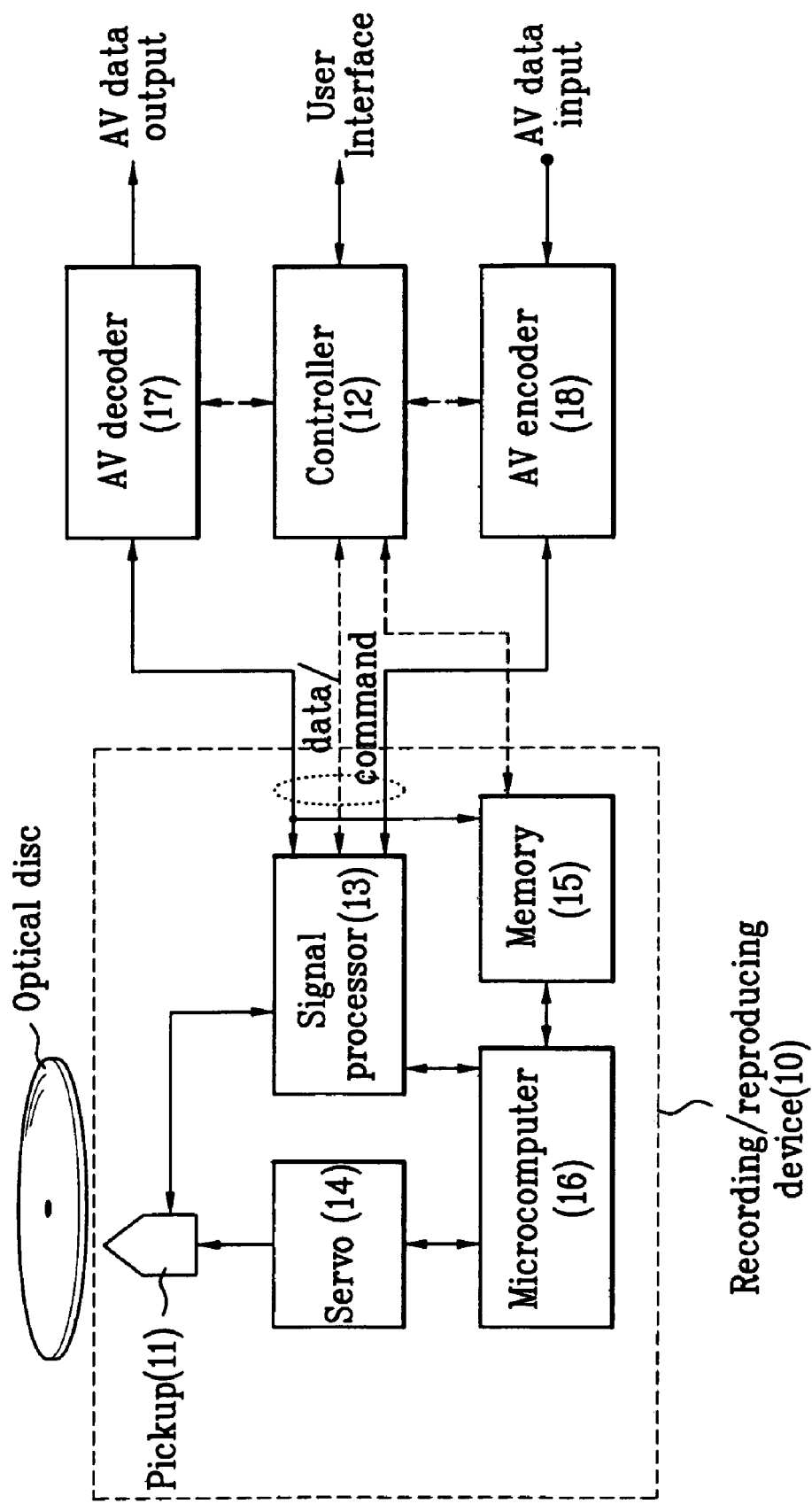
FIG. 5 illustrates a recording and reproducing apparatus of a recording medium according to the present invention.

FIG. 5 illustrates an optical recording and reproducing apparatus of a recording medium according to the present invention. The optical recording and reproducing apparatus, which records data on the optical disc or reproduces the data recorded thereon, includes a recording/reproducing device 20, a controller 12, an audio/video (AV) decoder 17, and an AV encoder 18. The recording/reproducing device 20 includes a pick-up unit 11 for directly recording data on the optical disc or for reading data recorded on the optical disc, a signal processor 13 either recovering the reproduction signal received from the pick-up unit 11 to a desired signal value, or modulating a signal to be recorded to an optical disc recordable signal and transmitting the modulated signal to the pick-up unit 11, a servo 14 accurately reading the signal from the optical disc, or controlling the operations of the pick-up unit 11, a memory 15 for temporarily storing the management information including the defect management information, and a microcomputer 16 controlling the above operations. An apparatus only including the recording/reproducing device 20 is referred to as a "drive", which is also used as a peripheral computer device.

Also, the controller 12 controls the overall operation of the optical recording and reproducing apparatus. And, according to the present invention, the controller 12 refers to user commands through a user interface and transmits a recording (or writing) and/or reproducing (or reading) command for recording data on the optical disc and for reproducing data to the recording/reproducing device 20. In addition, in accordance with the controls of the controller 12, the AV decoder 17 decodes the signal read from the optical disc and decodes the read signal, so as to recover the signal as desired information, thereby providing the recovered information to the user. And, in order to perform the function of recording a signal on the optical disc, the AV encoder 18 converts an input signal into a signal of a specific format (e.g., an MPEG-2 transport stream) depending upon the controls of the controller 12 and, then, provides the converted signal to the signal processor 13. Accordingly, depending upon the product, the microcomputer 16 and the controller 12 may be formed as a single body so as to form a controller part. Hereinafter, a method for recording defect management information and a method for formatting the recording medium using the optical recording and reproducing apparatus according to the present invention will now be described with reference to FIG. 6 and FIG. 7.

Figure 6:
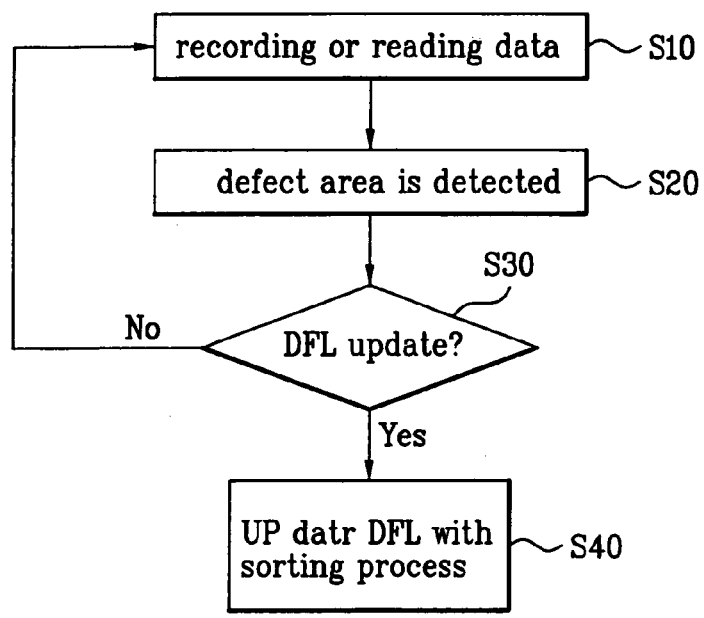
FIG. 6 illustrates a flow chart of a method for recording defect management information according to the present invention.

FIG. 6 illustrates a flow chart of a method for recording defect management information according to the present invention. When a disc is loaded in the optical recording and reproducing apparatus, the recording of data on the disc or the reading of data from the disc is initiated in accordance with the command of the controller 12 (S10). If a defect area is detected while performing Step 10 (S20), the microcomputer 16 decides whether or not the defect list (DFL) is to be updated (S30). More specifically, depending upon the system, either the defect list is immediately updated after the defect area has been detected, or the recording (or writing)/reproducing (or reading) process is performed during a predetermined period and all defect areas that are detected during the corresponding period are reported simultaneously so that the defect list can be updated.

In Step 30, if the defect list is to be updated, the defect entries that have already been registered within the defect list are sorted along with the currently detected defect entries, so as to create a new defect list (S40). The sorting process is performed based upon the recording method by each defect entry type and sorting rule. Therefore, for example, the format of the finally updated defect list may be the same as the format shown in FIG. 4B.

Figure 7:
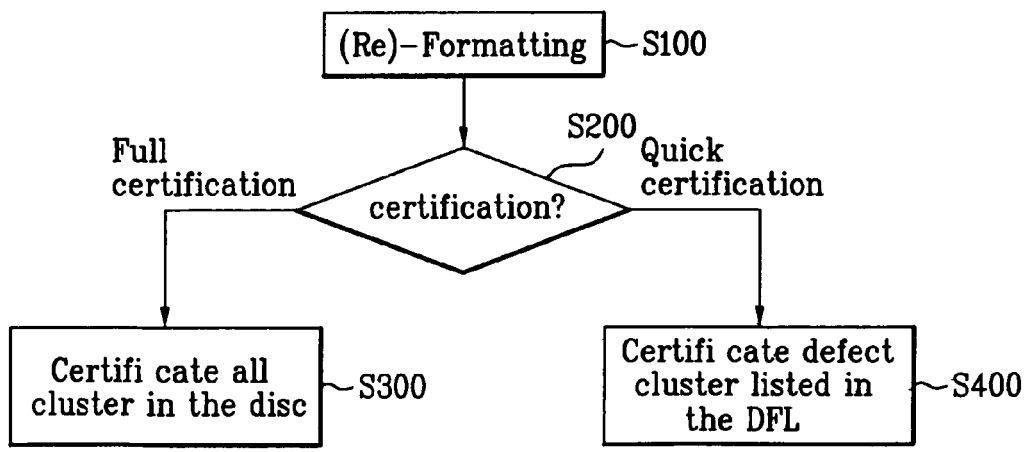
FIG. 7 illustrates a flow chart of a method for formatting the recording medium according to the present invention.

FIG. 7 illustrates a flow chart of a method for formatting the recording medium according to the present invention. In the present invention, the "formatting" process (wherein a "re-formatting" process is also included) is used for disregarding (or ignoring) the data initially existing within the disc and newly using the disc. Accordingly, when a formatting process is performed in accordance with a user command (S100), the disc may be newly used (or be re-used). When performing the formatting process, a certification process certifying all areas or a particular area within the disc may be selectively performed (S200). For example, all areas within the disc are sequentially certified starting from the first area so as to determine whether a defect exists or not. However, when a defect is detected a defect list (DFL) in accordance with the above-described defect entry recording method and sorting method. This step is particularly referred to as a 'Full certification' method (S300).

Although the 'Full certification' process satisfies the perfection of the certification process, a large amount of time is required for the process. Therefore, only the defective cluster registered as the defect area within the already existing defect list (DFL) may be selectively certified. This step is particularly referred to as a 'Quick certification' method (S400). When using the 'Quick certification' method, the certification process is performed based upon the registered defect entry. More specifically, the 'RAD 1' type, 'RAD 2' type, and 'NRD' type defect entries certify only the defective clusters in the user data area registered to the second field within each defect entry. Furthermore, the 'unusable' type defect entries certify only the defective clusters in the spare area registered to the third field within each defect entry.

For example, when performing the 'Quick certification' method based upon the defect list sorted as shown in FIG. 4A and FIG. 4B, the system is capable of sequentially certifying only the defective clusters starting from the inner circumference of the optical disc (i.e., starting from the cluster having the lowest PSN). Therefore, clusters 'b', 'd', and 'g', which are the 'unusable' defective clusters within the spare area, are sequentially certified, and clusters 'A', 'B', 'C', 'D', and 'E', which are the defective clusters within the user data area, are also sequentially certified.

The recording medium, and the method and apparatus for recording defect management information on the recording medium according to the present invention have the following advantages. By using the preferred defect management recording method and sorting method of the recording medium, the defect management information can be efficiently managed. Also, sorting the defect entries configuring the defect management information may also be facilitated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for recording information for managing a defective area in a recording medium, comprising:
generating defect management information including at least one defect entry for managing one or more defective areas within a user data area of the recording medium, the defect entry including status information for identifying a type of the corresponding defect entry, a first field for indicating a position of a defective area within the user data area and a second field for indicating a position of a replacement area within a spare area for replacing the defective area, wherein if the status information indicates that the corresponding defect entry is unusable, the first field is set to zero and the second field indicates an address of a defective cluster within the spare area; and
recording, by a recording apparatus, the defect management information in at least one of inner and outer zones of the recording medium.

2. The method of claim 1, wherein the status information further indicates whether or not the defective area is replaced with the replacement area.

3. The method of claim 1, wherein the second field further indicates a length of an unusable portion within the spare area.

4. The method of claim 1, wherein the defect entry further includes second status information for indicating a status of data recorded in the replacement area.

5. The method of claim 4, wherein the second status information indicates a predetermined value, if the status information indicates that the defective area is not replaced with the replacement area.

6. The method of claim 1, further comprising:
sorting the defect entries by at least one of values of the status information, the first field and the second field.

7. The method of claim 6, wherein the defect entries are sorted by type of the defect entry and by value of the first field within a same type of the defect entry.

8. An apparatus for recording information for managing a defective area in a recording medium, comprising:
a pickup configured to record/reproduce data on/from the recording medium; and
a controller, operatively coupled to the pickup, configured to control the pickup to record defect management information in at least one of inner and outer zones of the recording medium, the defect management information including at least one defect entry for managing one or more defective areas within a user data area of the recording medium, the defect entry including status information for identifying a type of the corresponding defect entry, a first field for indicating a position of a defective area within a user data area and a second field for indicating a position of a replacement area within the spare area for replacing the defective area, wherein if the status information indicates that the corresponding defect entry is unusable, the first field is set to zero and the second field indicates an address of a defective cluster within the spare area.

9. The apparatus of claim 8, wherein the status information further indicates whether or not the defective area is replaced with the replacement area.

10. The apparatus of claim 8, wherein the second field further indicates a length of an unusable portion within the spare area.

11. The apparatus of claim 8, wherein the controller is configured to control the pickup to further record second status information for indicating a status of data recorded in the replacement area.

12. The apparatus of claim 8, wherein the controller is configured to control the pickup to record the second status information with a predetermined value, if the status information indicates that the defective area is not replaced with the replacement area.

13. The apparatus of claim 8, wherein the controller is configured to sort the defect entries by at least one of values of the status information, the first field and the second field.

14. The apparatus of claim 13, wherein the controller is configured to sort the defect entries by type of the defect entry and by value of the first field within a same type of the defect entry.

15. A recording medium having a data structure for managing one of recording and reproducing by an apparatus, comprising:
   a data area for storing a user data area and a spare area; and
   a control data area for storing defect management information for managing one of recording and reproducing by the apparatus, the defect management information including at least one defect entry for managing one or more defetive areas within a user data area of the recording medium, the defect entry including status information for identifying a type of the corresponding defect entry, a first field for indicating a position of a defective area within the user data area and a second field for indicating a position of a replacement area within a spare area for replacing the defective area, wherein if the status information indicates that the corresponding defect entry is unusable, the first field is set to zero and the second field indicates an address of a defective cluster within the spare area, and wherein the control data area is included in at least one of inner and outer zones of the recording medium.

16. The recording medium of claim 15, wherein the status information further indicates whether or not the defective area is replaced with the replacement area.

17. The recording medium of claim 15, wherein the second field further indicates a length of an unusable portion within the spare area.

18. The recording medium of claim 15, wherein the defect entry further includes second status information for indicating a status of data recorded in the replacement area.

19. The recording medium of claim 18, wherein the second status information indicates a predetermined value, if the status information indicates that the defective area is not replaced with the replacement area.

20. The recording medium of claim 15, wherein the defect entries are sorted by at least one of values of the status information, the first field and the second field.

21. The recording medium of claim 20, wherein the defect entries are sorted by type of the defect entry and by value of the first field within a same type of the defect entry.

* * * * *